(12) United States Patent
Park

(10) Patent No.: US 7,306,260 B1
(45) Date of Patent: Dec. 11, 2007

(54) LAP FUSE BELT FOR A SEAT BELT

(75) Inventor: Young Joon Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/606,195

(22) Filed: Nov. 28, 2006

(30) Foreign Application Priority Data

Oct. 19, 2006 (KR) ............... 10-2006-0102061

(51) Int. Cl.
B60R 22/00 (2006.01)
(52) U.S. Cl. ............... 280/801.1; 280/805; 297/468; 297/470; 297/471
(58) Field of Classification Search ............ 280/801.1, 280/805; 297/468, 470, 471, 482, 485; 24/182, 24/183
See application file for complete search history.

(56) References Cited

U.S. PATENT DOCUMENTS

| 3,444,957 | A | * | 5/1969 | Ervin, Jr. ................ 182/3 |
| 3,891,272 | A | * | 6/1975 | Takada ................ 297/472 |
| 4,394,992 | A | | 7/1983 | Föhl |
| 4,854,608 | A | | 8/1989 | Barral |
| 5,050,906 | A | | 9/1991 | Kneip |
| 5,135,257 | A | * | 8/1992 | Short ................ 280/808 |
| 5,529,343 | A | * | 6/1996 | Klink ................ 280/805 |
| 5,609,365 | A | | 3/1997 | Holka |
| 5,618,059 | A | * | 4/1997 | Kim ................ 280/805 |
| 5,656,994 | A | * | 8/1997 | Heninger ................ 340/457.1 |
| 5,658,012 | A | * | 8/1997 | Villarreal et al. ........... 280/805 |
| 5,700,034 | A | * | 12/1997 | Lane, Jr. ................ 280/805 |
| 6,736,427 | B2 | * | 5/2004 | Herrmann et al. .......... 280/805 |
| 6,802,537 | B1 | * | 10/2004 | Tolfsen et al. ........... 280/801.2 |
| 6,871,877 | B2 | * | 3/2005 | Herrmann et al. .......... 280/805 |

FOREIGN PATENT DOCUMENTS

| EP | 0 909 684 A2 | 4/1999 |
| JP | 07-329712 | 12/1995 |
| KR | 1997-039838 | 7/1997 |
| KR | 1997-039885 | 7/1997 |
| KR | 1998-041465 | 8/1998 |
| KR | 1999-0027436 | 7/1999 |
| KR | 1999-031282 | 7/1999 |
| KR | 10-20060010115 A | 2/2006 |

* cited by examiner

Primary Examiner—Paul N. Dickson
Assistant Examiner—Toan C. To
(74) Attorney, Agent, or Firm—Morgan Lewis & Bockius LLP

(57) ABSTRACT

The present invention relates to a lap fuse belt for a seat belt. A lap fuse belt for a seat belt includes a plurality of lap fuse belt cases which are coupled to one another by receiving holes and coupling projections formed on surfaces thereof so as to house the lap fuse belt. The lap fuse belt reduces injuries on an occupant by dispersing impact.

2 Claims, 5 Drawing Sheets

LAP FUSE BELT FOR A SEAT BELT

CROSS-REFERENCE TO RELATED APPLICATION

This application claims priority to Korean Patent Application No. 10-2006-0102061 filed in the Korean Intellectual Property Office on Oct. 19, 2006, the disclosure of which is incorporated herein by reference.

BACKGROUND OF THE INVENTION (a) Field of the Invention

The present invention relates to a lap fuse belt for a seat belt. In particular, the present invention relates to a lap fuse belt for a seat belt which effectively absorbs impact and regulates load according to impact.

(b) Description of the Related Art

Generally, a seat belt is provided in order to prevent an occupant from being separated from a seat when a vehicle is involved in a crash. The seat belt is an important safety device, especially when a vehicle does not contain an airbag. The seat belt should not interfere with the driver's operation but should protect an occupant in an emergency situation.

Generally, the seat belt includes: a webbing locking retractor for reducing the amount of spool out of the webbing; a pretensioner for rewinding the webbing when a vehicle is impacted; and a load limiter which slightly loosens the webbing so as to prevent the seat belt from pressing against an occupant.

However, in the case that an occupant is protected by the seat belt and without an airbag, the head of an occupant may collide with a crash pad even though the load limiter is applied. In order to solve this problem, a method of applying a lap fuse belt has been introduced so as to disperse the impact acting on the seat belt thereby reducing injuries on an occupant.

SUMMARY OF THE INVENTION

The present invention provides a lap fuse belt for a seat belt in which a plurality of lap fuse belt cases is adopted. Projections and holes which are coupled to one another are formed on the sides of the lap fuse belt cases so as to regulate the separation load of the cases, thereby effectively dispersing the impact and easily regulating the separation load of the cases.

An exemplary embodiment of the present invention provides a lap fuse belt for a seat belt which are momentarily extended when impact acts on a vehicle so as to reduce injuries on an occupant. The lap fuse belt for a seat belt comprises a plurality of lap fuse belt cases which are coupled to one another by receiving holes and coupling projections formed on surfaces thereof so as to house the lap fuse belt. The plurality of lap fuse belt cases is further separated from one another when the lap fuse belt is momentarily extended so as to absorb impact.

The lap fuse belt cases include: a body which is formed along a lengthwise direction of the lap fuse belt which is cuboid-shaped; a receiving hole which is formed inside the body in a lengthwise direction and both ends of which are opened such that the lap fuse belt is inserted into one end thereof and is drawn out from the second end thereof; a plurality of coupling projections which is protruded to the outside at one side of the body; and a plurality of coupling holes which is indented on a side of the body opposite to the side on which the coupling projections are formed and corresponds to a position and a shape of the coupling projection.

The lap fuse belt may pass through the plurality of the lap fuse belt cases in a zigzag such that when the lap fuse belt cases are separated from one another, the lap fuse is unfolded.

DESCRIPTION OF REFERENCE NUMERALS INDICATING PRIMARY ELEMENTS IN THE DRAWINGS

| 100: | vehicle body | 110: | belt buckle |
|---|---|---|---|
| 120: | seat | 200: | seat belt |
| 120: | coupling plate | 300: | lower anchor |
| 400: | lap fuse belt | 500: | lap fuse belt case |
| 510: | body | 512: | receiving hole |
| 520: | coupling projection | 530: | coupling hole |

DETAILED DESCRIPTION OF THE INVENTION

An exemplary embodiment of the present invention will hereinafter be described in detail with reference to the accompanying drawings.

Figure 1:
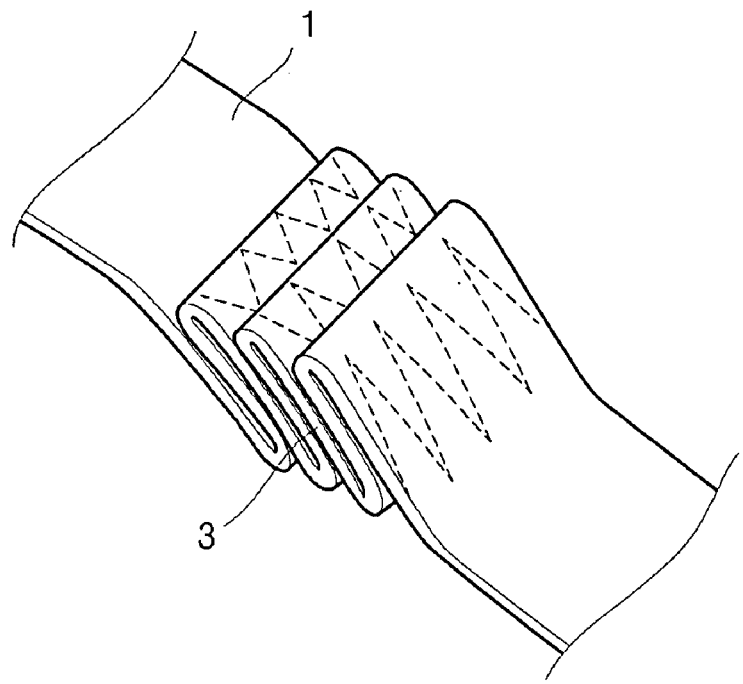
FIG. 1 is a perspective view of an example of a conventional lap fuse belt.
Figure 2:
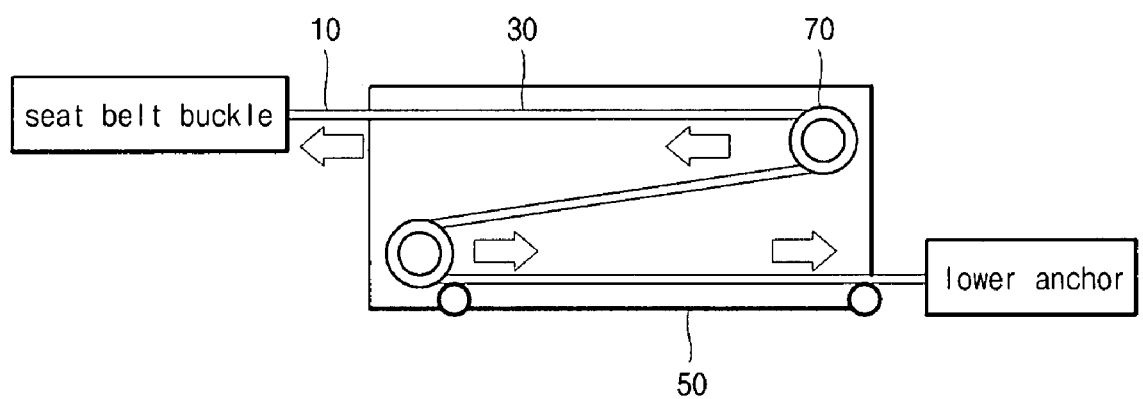
FIG. 2 is a perspective view of another example of a conventional lap fuse belt.

FIG. 1 is a perspective view of an example of a conventional lap fuse belt. FIG. 2 is a perspective view of another example of a conventional lap fuse belt.

As shown in FIG. 1, in a lap fuse belt 3 which is formed by folding a portion of a seat belt 1 and then sewing the same, impact load is mainly determined by the intensity of a thread, a sewing pattern, a length of sewing, etc.

As shown in FIG. 2, a portion of a seat belt 10 is installed within a lap fuse belt case 50 while it detours around a boss 70 in a zigzag. When a vehicle is impacted, the boss 70 is broken by the impact.

Figure 3:
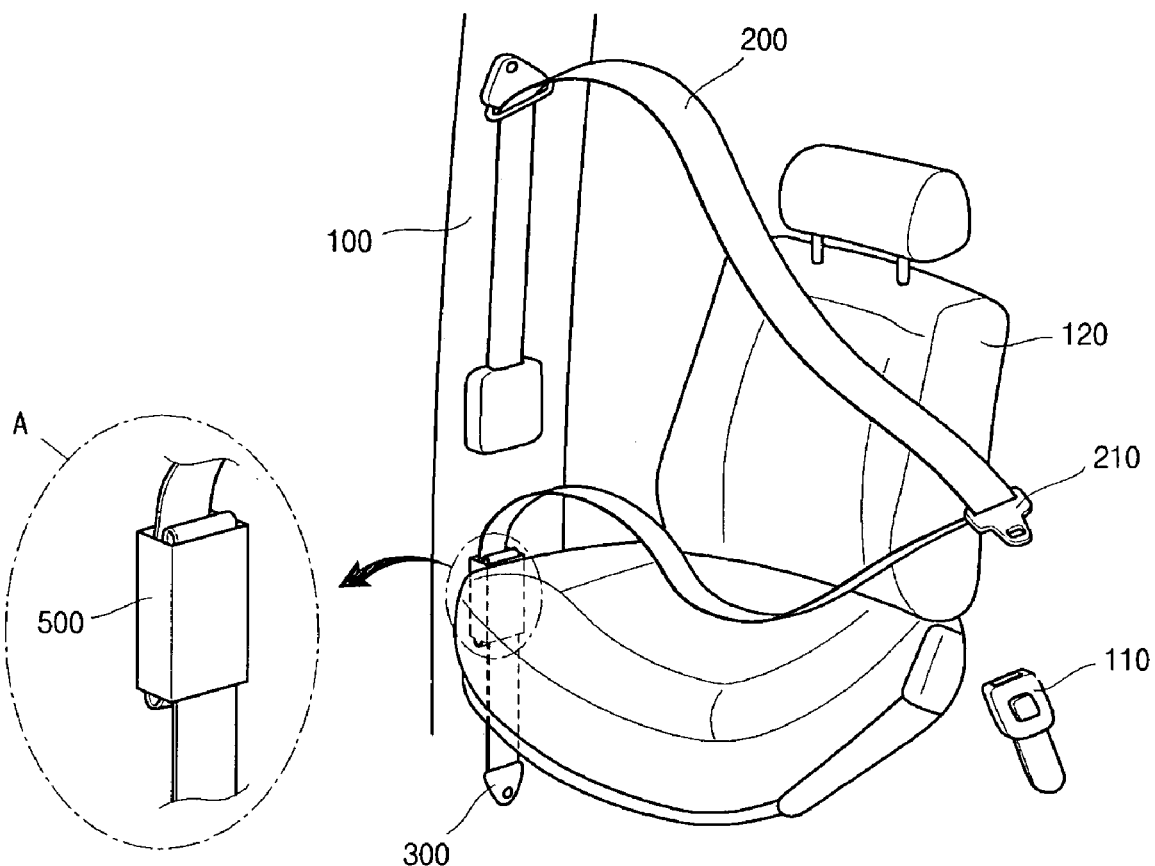
FIG. 3 is a perspective view showing a seat belt according to an exemplary embodiment of the present invention.

As shown in FIG. 3, a lap fuse belt for a seat belt according to an exemplary embodiment of the present invention includes: a seat belt 200 supporting an occupant sitting in the front of the vehicle, and lap fuse belt cases 500, 500', and 500" which are designed to reduce injuries on an occupant when vehicle is impacted.

An end of the seat belt 200 is extendably connected to a vehicle body 100, thereby fixing an occupant seated in a seat 120 so as not to move away from the seat 120. The second end of the seat belt 200 is fixed to the vehicle body 100 by a lower anchor 300. An occupant is prevented from moving away by the coupling of a coupling plate 210 which is movably connected to the seat belt 200 so as to fix the seat belt 200 to a belt buckle 110 which is fixed to the vehicle body 100.

Figure 4:
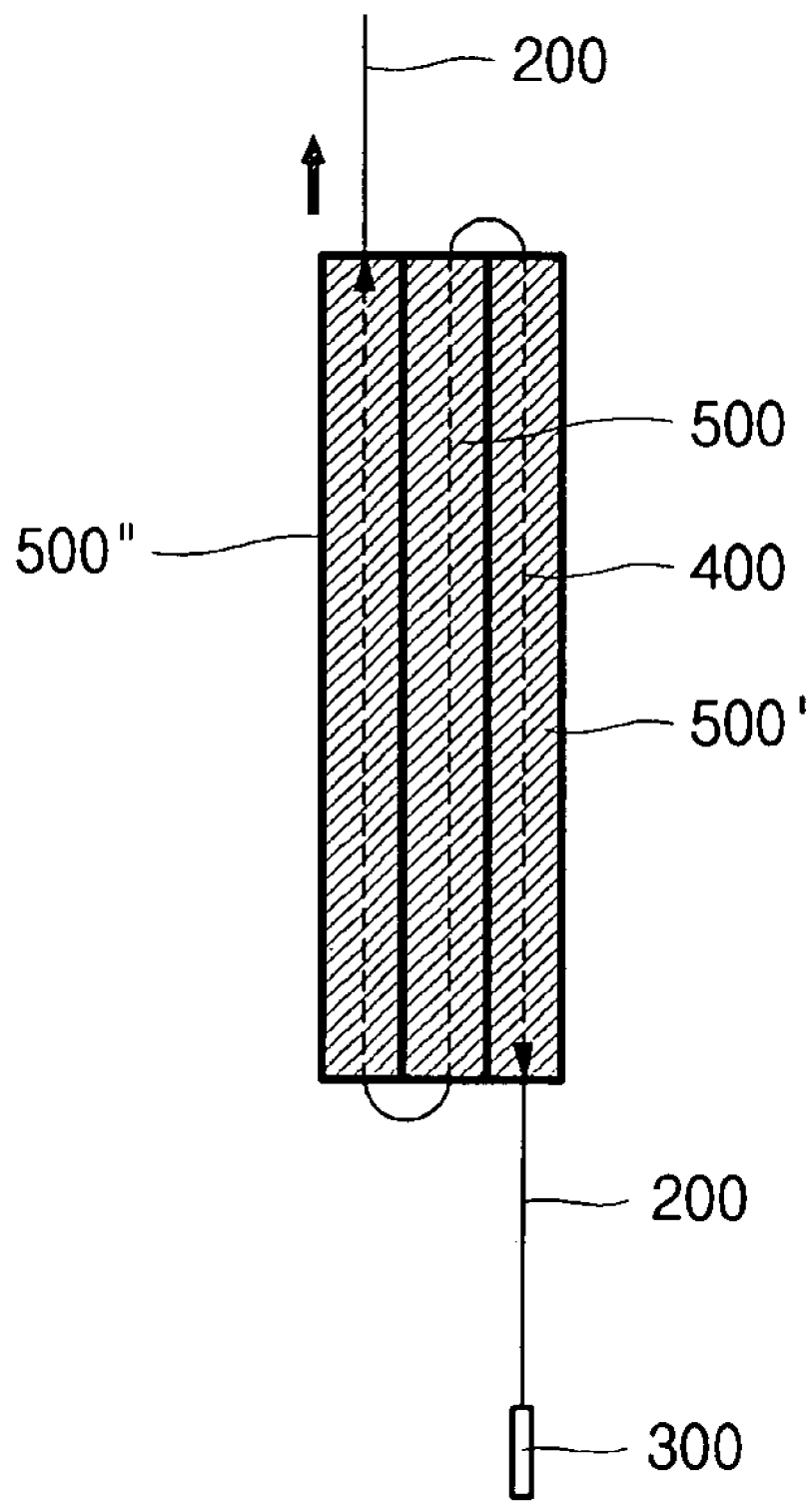
FIG. 4 is a cross sectional view of a lap fuse belt case shown in a portion A of FIG. 3.

As shown in FIG. 4, the lap fuse belt 400 is configured by folding a portion of the seat belt 200 in a zigzag or is unfolded when tensile force acting on the seat belt 200 increases when vehicle is impacted, thereby dispersing impact so as to reduce injuries on an occupant. In other words, the lap fuse belt 400 denotes a portion of the seat belt 200 which passes through the lap fuse belt cases 500, 500', and 500".

Since the lap fuse belt cases 500, 500', and 500" to which the lap fuse belt 400 is inserted are coupled to the lower anchor 300 of the seat belt 200, it is preferable that the lower anchor 300 is fixed to the vehicle body 100 which inclines toward the lower part of the seat 120 so as to obtain a coupling position.

Figure 5:
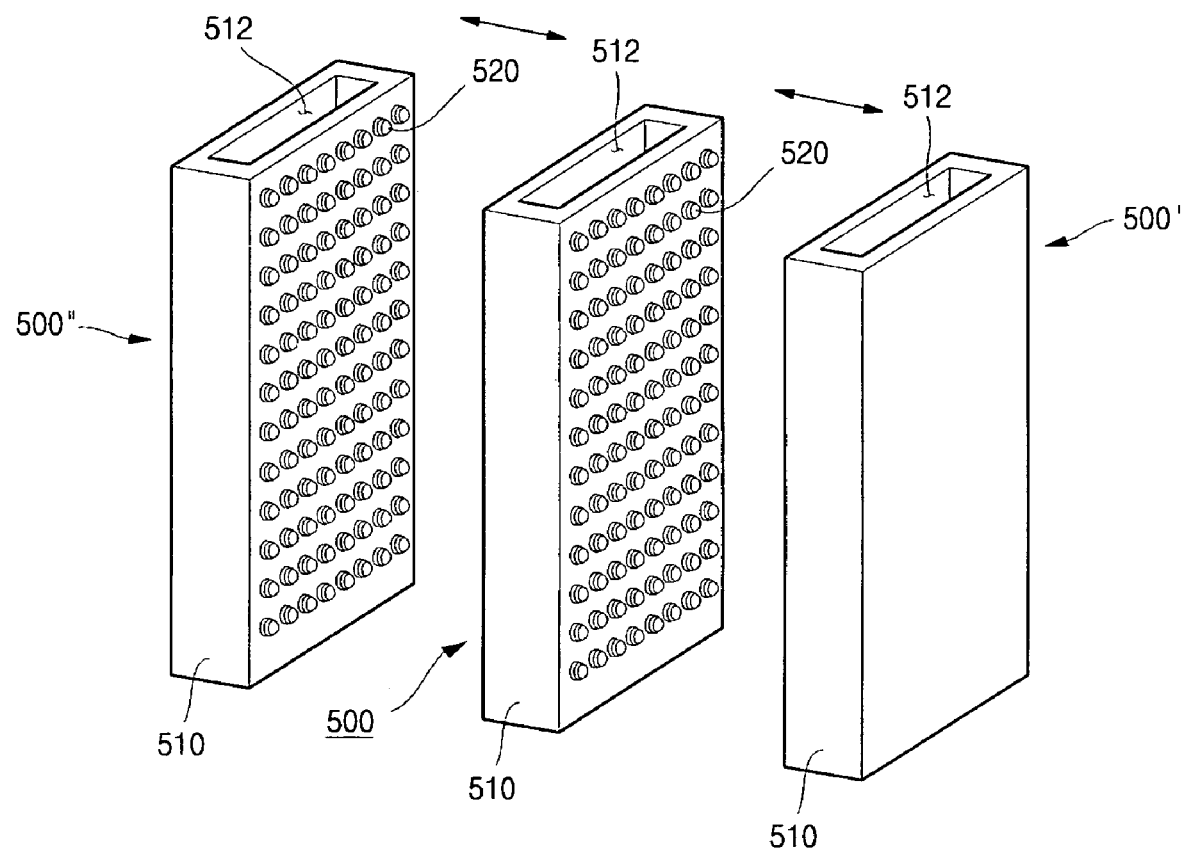
FIG. 5 is a frontal perspective view of a lap fuse belt case shown in a portion A of FIG. 3.
Figure 6:
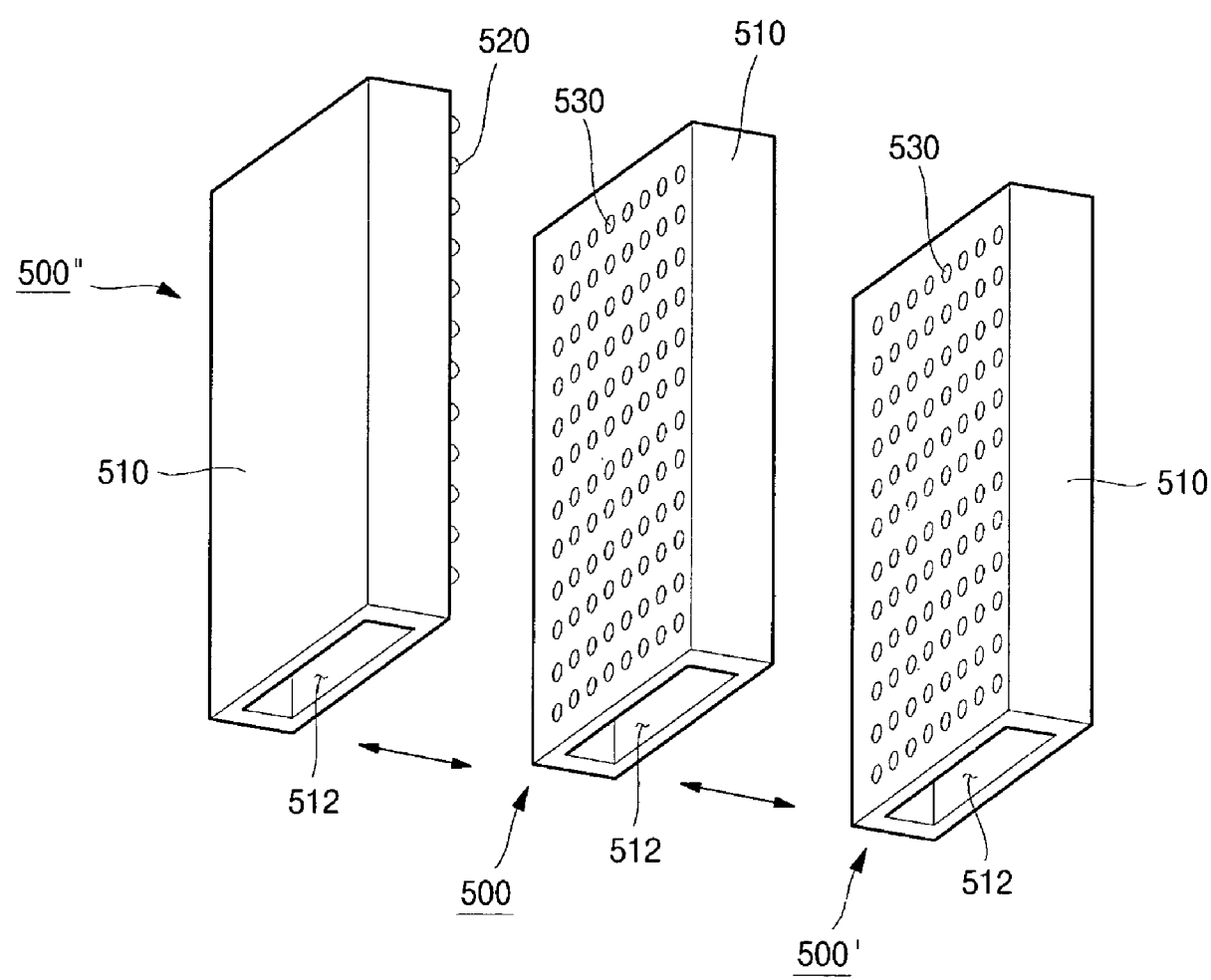
FIG. 6 is a rear perspective view of a lap fuse belt case shown in a portion A of FIG. 3.

As shown in FIG. 4 to FIG. 6, the lap fuse belt case 500, 500', and 500" is formed along a lengthwise direction of the seat belt 200. The width of the lap fuse belt cases 500, 500', and 500" correspond to a width of the lap fuse belt 400. The lengths of the fuse belt cases 500, 500', and 500" thereof are formed at a value at which it is not exposed toward an occupant while it is covered with a side of the seat 120.

The lap fuse belt cases 500, 500', and 500" include: a cuboid-shaped body 510; a receiving hole 512 formed at an inside of the body 510 and both ends of which are opened so as to receive the lap fuse belt 400; and a plurality of coupling projections 520 and coupling holes 530 which are formed on surfaces of the body 510.

A plurality of the lap fuse belt cases 500, 500', and 500" are used. For ease of description, the first case 500, the second case 500', and the third case 500" are shown in the drawing (referring to FIG. 5 and FIG. 6).

As shown in FIG. 5 and FIG. 6, in the first case 500, a plurality of the coupling projections 520 are formed at a first side of the body 510, and a plurality of the coupling holes 530 are formed at second side of the body 510. In order to be coupled to this, the second case 500' is provided with the coupling holes 530 or the coupling projections 520 corresponding to the coupling projections 520 or the coupling holes 530 formed at a side which is coupled to the first case 500. In addition, the third case 500" is provided with the coupling holes 530 or the coupling projections 520 corresponding to the coupling projections 520 or the coupling holes 530 formed at a side which coupled to the first case 500.

The second case 500' and the third case 500" are coupled to both sides of the first case 500 so as to form one assembly. The second case 500' and the third case 500" are fixed to one another by engagement of the coupling projection 520 and the coupling hole 530.

The lap fuse belt 400 is inserted into a lower end of the second case 500', and is drawn out from an upper end of the second case 500'. Then, the lap fuse belt 400 is inserted into an upper end of the first case 500, and is drawn out from a lower end of the first case 500. Then, the lap fuse belt 400 is inserted into a lower end of the third case 500", and is drawn out from an upper end of the third case 500" and is extended. The extension of the lap fuse belt 400 from the upper end of the third case 500" forms the seat belt 200 for supporting an occupant such that an occupant can be remained to be seated in the seat 120. In other words, the lap fuse belt 400 passes through the three cases 500, 500', and 500" in a zigzag. When the lap fuse belt 400 is unfolded, the lap fuse belt 400 becomes linear.

A plurality of the lap fuse belt cases 500, 500', and 500" which are coupled in this way are separated from each other when vehicle is impacted such that the lap fuse belt 400 is unfolded. In this process, the impact is dispersed such that injuries on an occupant can be reduced.

The operations and effects of a lap fuse belt for a seat belt according to an exemplary embodiment of the present invention will be explained hereinafter.

As shown in FIG. 3 to FIG. 6, when a vehicle is impacted, the body of an occupant is pushed toward the front of a vehicle. When an occupant is pushed to the front of the vehicle, tensile force acting on the seat belt 200 is increased. If the tensile force of the seat belt 200 is increased, the seat belt 200 is automatically fixed, and presses the upper body part of an occupant who is pushed to the front of a vehicle. At this time, if the tensile force acting on the seat belt 200 reaches a predetermined load, the lap fuse belt 400 is pulled by force such that force acts on the lap fuse belt cases 500, 500', and 500". Accordingly, the coupling of the lap fuse belt cases 500, 500', and 500" is released, thereby unfolding the lap fuse belt 400, and reducing the load acting on the body of an occupant. In other words, while the three lap fuse belt cases 500, 500', and 500" are separated from one another by force, impact is absorbed so as to disperse impact, thereby reducing injuries on an occupant.

The lap fuse belt cases 500, 500', and 500" regulates the number of the coupling projection 520 and the coupling hole 530 which are formed in the body 510 and consequently, regulates the separation load. Accordingly, modification according to set load can be easily made, so that it can be used for various types of a vehicle.

In addition, when compared to a conventional lap fuse belt 3 or a conventional lap fuse belt case 50 which can be used only one time, the lap fuse belt cases 500, 500', and 500" can be reused by coupling again, thereby reducing cost.

Although the number of the lap fuse belt case is three in the above-described embodiment of the present invention, it is not limited thereto, and the number of the lap fuse belt case can be varied according to predetermined load.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A lap fuse belt for a seat belt comprising a plurality of lap fuse belt cases which are coupled to one another by receiving holes and coupling projections formed on surfaces thereof so as to house the lap fuse belt, wherein each of the lap fuse belt cases comprises:
   a cuboid-shaped body which is formed along a lengthwise direction of the lap fuse belt;
   a receiving hole which is formed inside the body in a lengthwise direction and both ends of which are opened such that the lap fuse belt is inserted into one end thereof and is drawn out from the second end thereof;

a plurality of coupling projections which protrude to the outside at one side of the body; and a plurality of coupling holes which are indented on a side of the body opposite to the side on which the coupling projections are formed, and correspond to a position and a shape of the coupling projections.

2. The lap fuse belt of claim 1, wherein the lap fuse belt passes through the plurality of the lap fuse belt cases in a zigzag such that when the lap fuse belt cases are separated from one another, the lap fuse belt is unfolded.

* * * * *